(12) United States Patent
Torgerson

(10) Patent No.: US 11,517,399 B2
(45) Date of Patent: Dec. 6, 2022

(54) DENTAL ISOLATION SYSTEM

(71) Applicant: Spencer Torgerson, St. George, UT (US)

(72) Inventor: Spencer Torgerson, St. George, UT (US)

( * ) Notice: Subject to any disclaimer, the term of this patent is extended or adjusted under 35 U.S.C. 154(b) by 266 days.

(21) Appl. No.: 16/856,325

(22) Filed: Apr. 23, 2020

(65) Prior Publication Data

US 2020/0337803 A1 Oct. 29, 2020

Related U.S. Application Data

(60) Provisional application No. 62/837,614, filed on Apr. 23, 2019.

(51) Int. Cl.
*A61C 3/00* (2006.01)
*A61C 5/82* (2017.01)

(52) U.S. Cl.
CPC . *A61C 3/00* (2013.01); *A61C 5/82* (2017.02)

(58) Field of Classification Search
CPC .... A61C 5/82; A61C 3/00; A61C 3/14; A61C 8/00; A61C 7/04; A61C 7/303; A61C 5/80; A61C 5/00; A61B 17/12009; B25B 27/0028; B25B 27/0092; B25B 7/02

USPC .................................................. 433/139, 136
See application file for complete search history.

(56) References Cited

U.S. PATENT DOCUMENTS

| | | | | |
|---|---|---|---|---|
| 741,890 | A * | 10/1903 | Craigie | A61C 5/82 |
| | | | | 433/136 |
| 2,840,082 | A * | 6/1958 | Salvatore | A61B 17/12009 |
| | | | | 606/140 |
| 2005/0191598 | A1* | 9/2005 | Anderson | A61C 3/10 |
| | | | | 433/159 |
| 2012/0203248 | A1* | 8/2012 | Wadsworth | A61D 1/06 |
| | | | | 606/141 |

* cited by examiner

*Primary Examiner* — Ralph A Lewis
*Assistant Examiner* — Mirayda A Aponte
(74) *Attorney, Agent, or Firm* — Gurr Brande & Spendlove, PLLC; Robert A. Gurr

(57) ABSTRACT

A dental isolation system includes a dental tool that has a handle portion at a proximal end, a tip portion at an opposite, distal end, and a body portion extending between the handle portion and the tip portion. The handle portion has handles and finger apertures so that a dentist can manipulate the distal end. The tip portion is inserted into an O-ring of a dental dam and, when actuated by a dentist, the tip portion forms a quadrant, allowing the stretched O-ring to easily fit over a tooth.

4 Claims, 16 Drawing Sheets

DENTAL ISOLATION SYSTEM

CROSS-REFERENCE TO RELATED APPLICATIONS

This application claims the benefit of U.S. Provisional Application Ser. No. 62/837,614, filed on Apr. 23, 2019, which is incorporated herein by reference.

TECHNICAL FIELD

The present disclosure relates to the field of dentistry. More particularly, the present disclosure relates to a dental dam and tool that eliminates the need for metal clamps to secure a dental dam in place.

BACKGROUND

The field of dentistry has been using different means of isolating teeth from saliva, other teeth, and the tongue for more than 50 years. In fact, the American Dental Association (ADA) has stated that for every invasive procedure performed in the oral cavity, there must be proper isolation. It is advantageous to have proper isolation because it helps to avoid contaminating the work area and prevents tooth preparation debris from being distributed around the mouth of a patient. The most common method for complete isolation is a complicated system that includes a sheet of latex held onto a tooth with a series of metal clamps. The metal clamp is installed first on a suitable anchor tooth and then the rubber dam is stretched around the metal clamp and allowed to slide thereunder, whereupon the dam is held securely in place.

Although metal clamps are effective for their intended purpose, they can cause discomfort to the patient and can be difficult to work with. Further, the clamps are small enough to fit around a tooth, but large enough to obstruct a patient's airway should they be dropped in the airway. The placement of metal clamps is also time consuming, which is undesirable to both patient and doctor. In particular, time is consumed by the need to tie a "safety line" of floss to each clamp used for withdrawal from the patient's airway if the clamp falls therein. Moreover, time is consumed by the usual need to try several different sizes before a suitable size is determined.

Another drawback to conventional metal clamps is that the height of contour of a tooth cannot always be reached, which means that a stable placement of the metal clamp is impossible. Further, trauma to soft tissues is yet another problem associated with metal clamps. The metal clamp can press into the soft gingival tissue and do temporary or even permanent damage. Finally, metal clamps tend to restrict access to the clamped tooth and therefore hinder the dental procedure being undertaken. Because it is complex, time consuming, and uncomfortable for both the dentist and the patient, many practitioners forgo use of this system and claim to have isolation with vacuum suction and a dental assistant. While this has become a widely acceptable practice in the industry, it still does not meet the standard of complete isolation as instructed by the ADA.

Accordingly, there is a need for a dental isolation system that eliminates the need for metal clamps, is easy to use, comfortable for patients, and that will allow dentists to practice in a more sterile environment. The present disclosure seeks to solve these problems and others.

SUMMARY OF EXAMPLE EMBODIMENTS

In one embodiment, a dental isolation system comprises a dental tool having a handle portion at a proximal end, a tip portion at an opposite, distal end, and a body portion extending between the handle portion and the tip portion. The handle portion comprises finger apertures. The body portion comprises a first shaft member and a second shaft member being of equal size and a mirror image of one another and pivotally coupled via a shaft member pin near the distal end. The body portion further comprises pivoting bars and lower arm manipulation bars pivotally coupled to one another by a pivot pin on a proximal end and in a void between the first and the second shaft members. The distal ends of the pivoting bars are positionable within bar channels on an inner surface of the first and second shaft members. The distal ends of the lower arm manipulation bars are positionable within manipulation channels on the inner surface of the first and second shaft members. Lastly, the body portion comprises a loop that is positioned around the first and second shaft members and moveable along a plurality of slots on an outer surface of the first and second shaft members for controlling the distance between the handle and, ultimately, the distal tip. The tip portion comprises a plurality of arms coupled to the first and second shaft members. At an opposite end, the plurality of arms comprise a plurality of prongs forming a quadrant.

The dental isolation system further comprises a dental dam with an O-ring integrated therein. Further, the dental dam has a frame around its perimeter to ensure that it is stretched over the entire oral cavity and rests comfortably on a patient's face. The dental tool is used to expand the O-ring on the dental dam so that the dam may be placed around a tooth of a patient.

In one embodiment, a dental isolation system comprises a carrying case that includes a housing, a recessed dental tool portion, and a recessed dental dam portion. The carrying case also comprises a lid that is hingedly attached thereto and a handle.

DETAILED DESCRIPTION OF EXAMPLE EMBODIMENTS

Figure 1:
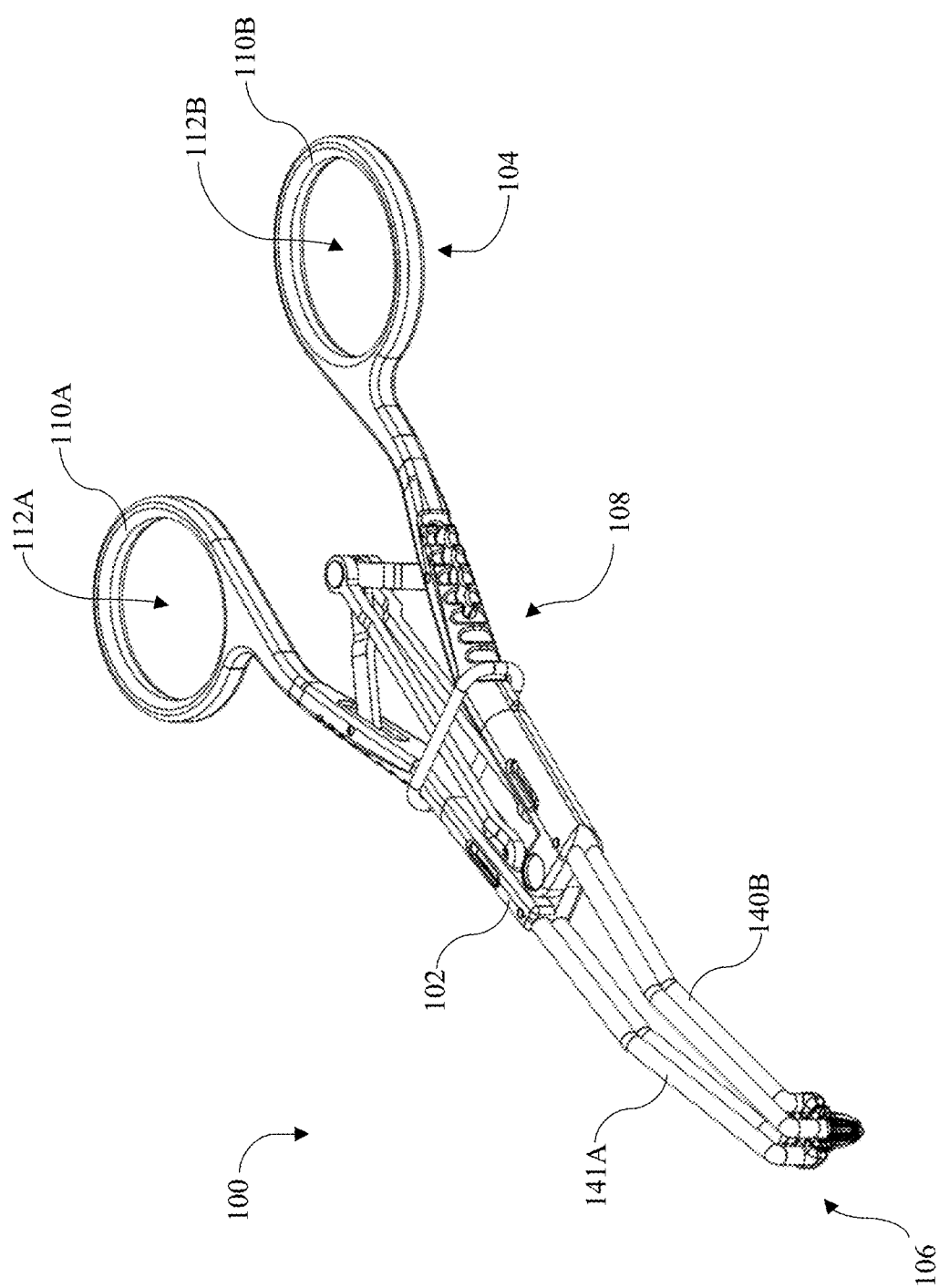
FIG. 1 is a top, front perspective view of a dental tool of a dental isolation system.

The following descriptions depict only example embodiments and are not to be considered limiting in scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," do not necessarily refer to the same embodiment, although they may.

Reference to the drawings is done throughout the disclosure using various numbers. The numbers used are for the convenience of the drafter only and the absence of numbers in an apparent sequence should not be considered limiting and does not imply that additional parts of that particular embodiment exist. Numbering patterns from one embodiment to the other need not imply that each embodiment has similar parts, although it may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various sequences and arrangements while still falling within the scope of the present invention.

The term "coupled" may mean that two or more elements are in direct physical contact. However, "coupled" may also mean that two or more elements are not in direct contact with each other, but yet still cooperate or interact with each other.

The terms "comprising," "including," "having," and the like, as used with respect to embodiments, are synonymous, and are generally intended as "open" terms (e.g., the term "including" should be interpreted as "including, but not limited to," the term "having" should be interpreted as "having at least," the term "includes" should be interpreted as "includes, but is not limited to," etc.).

As previously discussed, there is a need for a dental isolation system that eliminates the need for metal clamps, is easy to use, comfortable for patients, and that will allow dentists to practice in a more sterile environment. The dental isolation system disclosed herein solves these problems and others.

Generally, the dental isolation system includes a dental tool that is used in conjunction with a dental dam sheet. The dental tool has a plurality of prongs at a distal end that form a quadrant and come together in a closed position. The dental tool is used to expand an O-ring that is integrated into the dental dam sheet. Specifically, the O-ring can be opened with the dental tool, allowing the diameter of the O-ring to be stretched thin enough to fit in between two teeth. For example, as the user squeezes and decreases the distance between handles of the dental tool, the plurality of prongs spread the O-ring. When the O-ring is released by the dental tool and placed around a tooth, it will be secure enough to hold the dental dam sheet in place without movement, thereby isolating the tooth. It will be appreciated that a benefit to this system is that it will allow a dentist to perform work on all surfaces of the isolated tooth without any inhibition from a metal clamp, such as those used in the prior art. It will be further appreciated that the dental tool may be of the same shape and general design of other dental surgical tools so that dentists would have familiarity with how it operates and how the tool feels in the hand.

Figure 2:
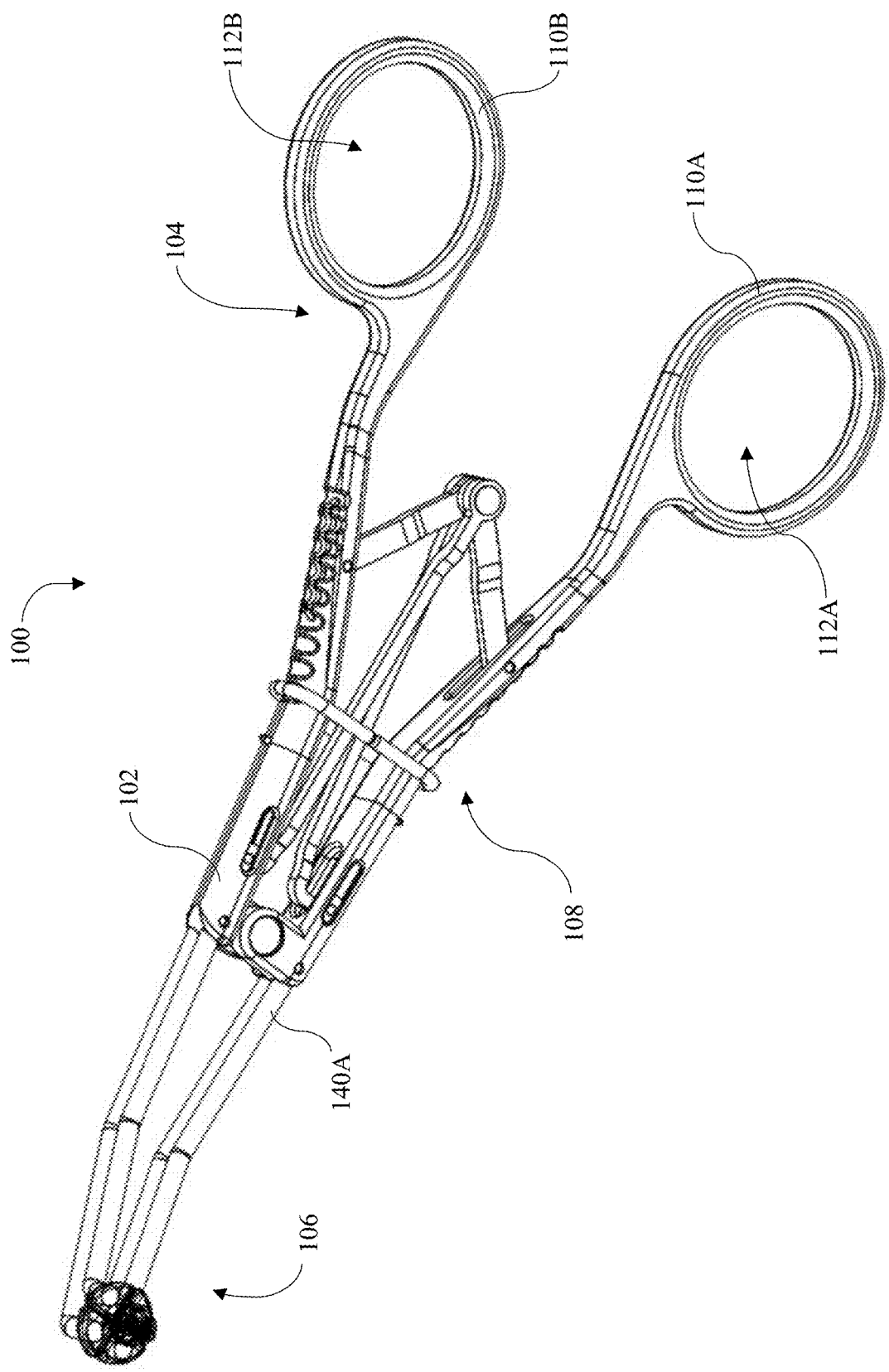
FIG. 2 is a bottom perspective view of a dental tool of a dental isolation system.
Figure 3:
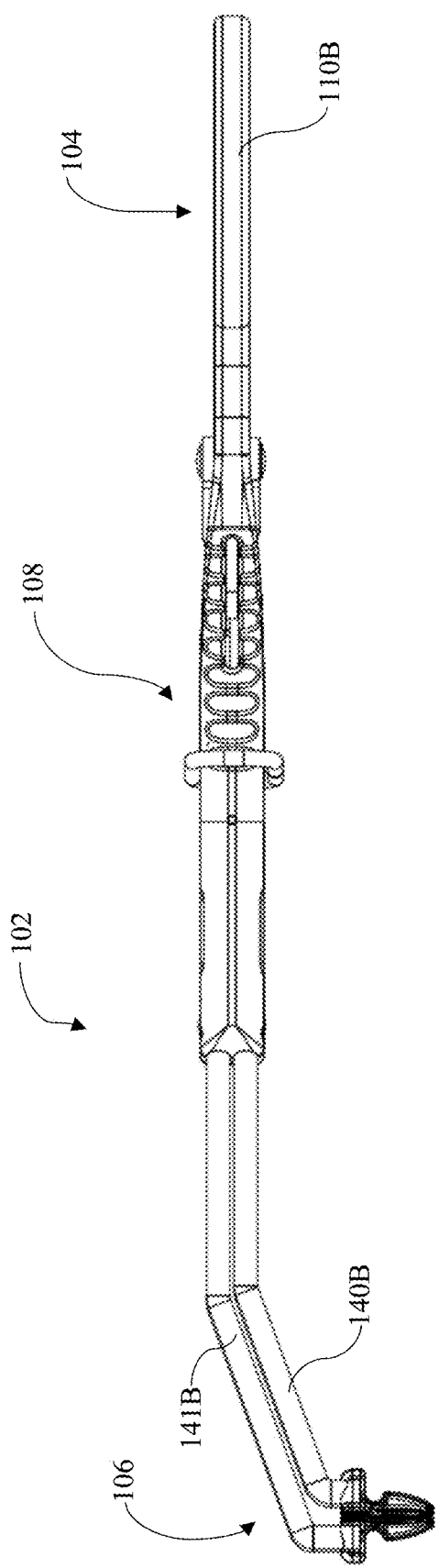
FIG. 3 is a side elevation view of a dental tool of a dental isolation system.
Figure 4:
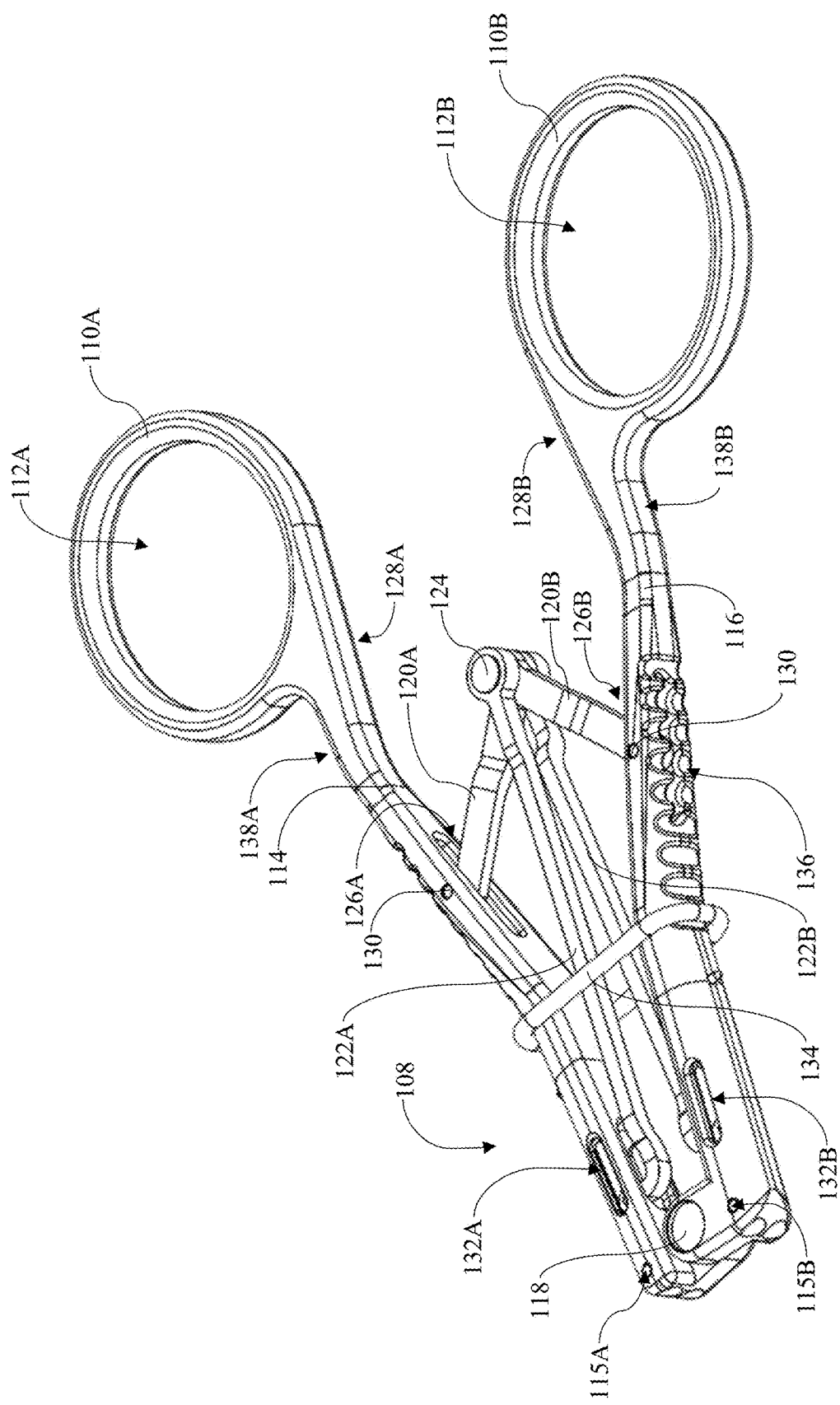
FIG. 4 is a top perspective view of a handle and body portion of a dental tool of a dental isolation system.
Figure 5:
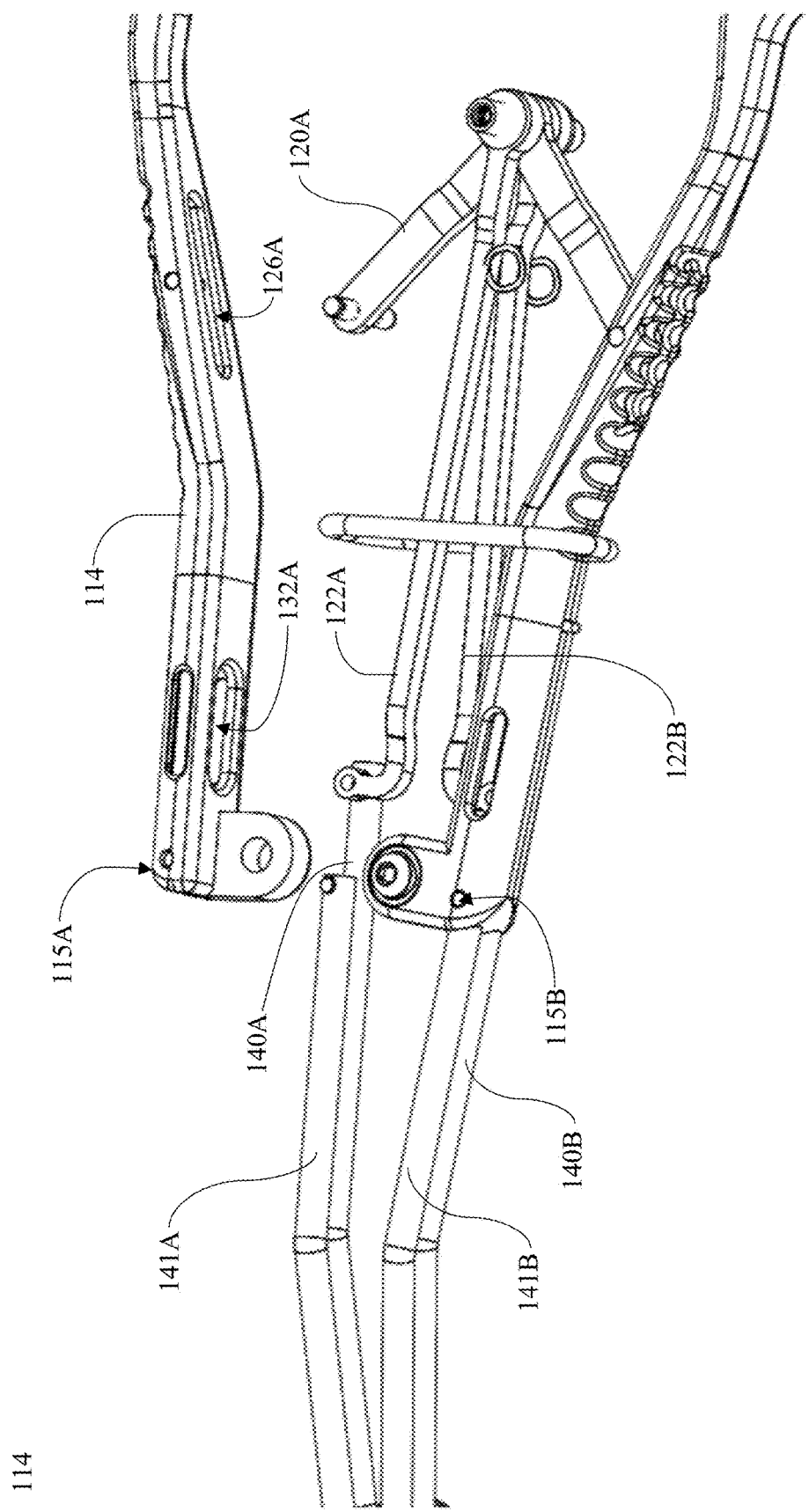
FIG. 5 is a top, partially disassembled view of a body portion of a dental tool of a dental isolation system.
Figure 6:
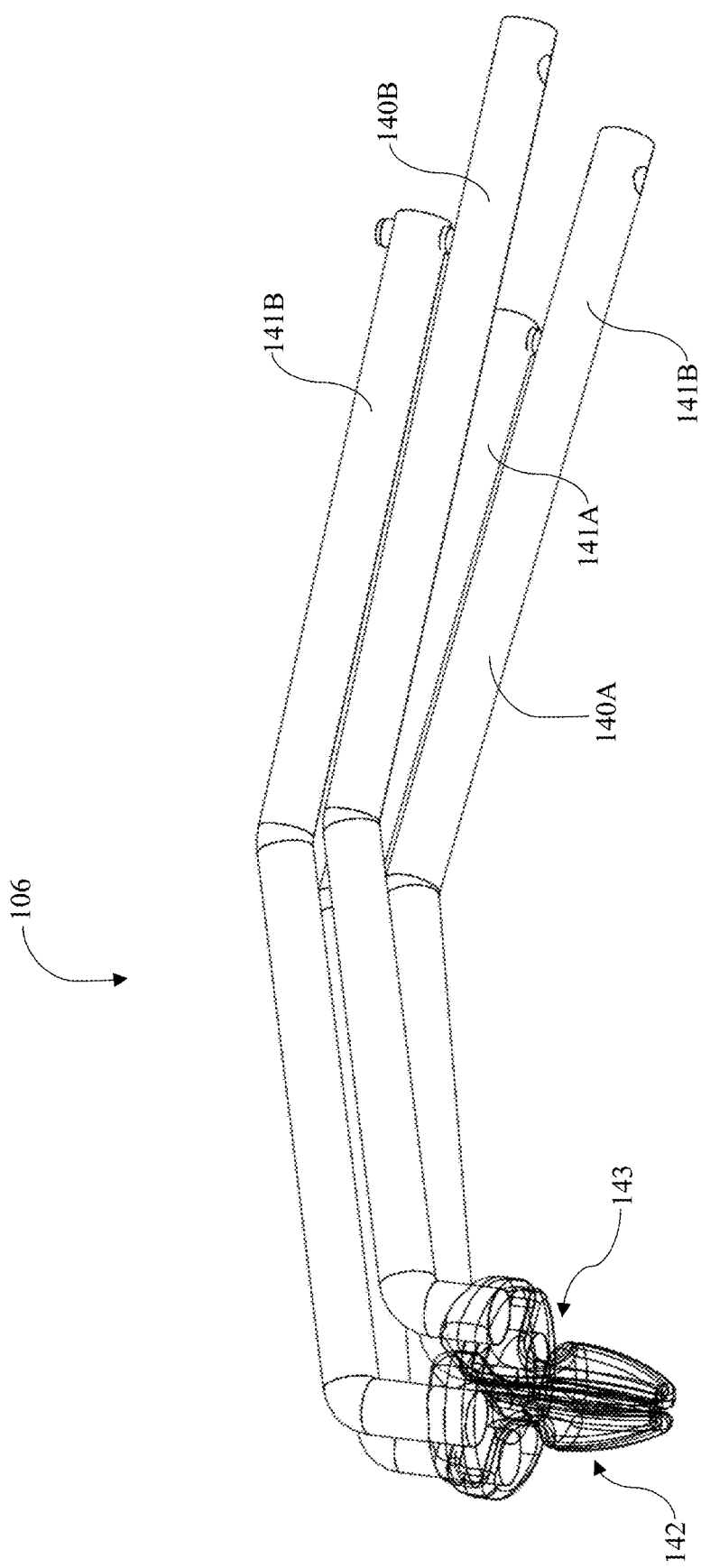
FIG. 6 is a bottom perspective view of a tip of a dental tool comprising a plurality arms and prongs, of a dental isolation system.

As shown in FIGS. 1-3, in one embodiment, a dental isolation system 100 comprises a dental tool 102. The dental tool 102 comprises a handle portion 104 at an end proximal to the dentist, a tip portion 106 at an opposite, distal end, and a body portion 108 extending between the handle portion 104 and the tip portion 106. The handle portion 104 comprises handles 110A, 110B and finger apertures 112A, 112B so that a dentist can manipulate the dental tool 102.

Referring to FIGS. 4-10, the body portion 108 comprises a first shaft member 114 and a second shaft member 116 being of equal size and a mirror image of one another and pivotally coupled, near the distal end, by a shaft member pin 118. The shaft member pin 118 allows the first and second shaft members 114, 116 to pivot in relation to one another. The body portion 108 further comprises pivoting bars 120A, 120B and lower arm manipulation bars 122A, 122B pivotally coupled to one another by a pivot pin 124 on a proximal end and in a void between the first and the second shaft members 114, 116.

The distal ends of the pivoting bars 120A, 120B are positionable within bar channels 126A, 126B on an inner surface 128A, 128B of the first and second shaft members 114, 116. The pivoting bars 120A, 120B may couple to the bar channels 126A, 126B by using bar pins 130, attached to the distal end of the pivoting bars 120A, 120B, that are inserted into bar pin apertures. Further, the distal ends of the lower arm manipulation bars 122A, 122B are positionable within manipulation channels 132A, 132B on the inner surface 128A, 128B of the first and second shaft members 114, 116. While pivoting bars 120A, 120B, and shafts 122A, 122B are shown, it will be appreciated that other embodiments of the dental tool 100 may simply have a single pivoting pin, similar to scissors or other typical forceps in the art. Lastly, the body portion 108 comprises a loop 134 that is positioned around the first and second shaft members 114, 116 and moveable along a plurality of slots 136 on an outer surface 138A, 138B of the first and second shaft members 114, 116 for controlling the distance between the handles 110A, 110B and, ultimately, the tip portion 106 (FIG. 1) and securing the dental tool 102 in an open position. Because the dental tool 102 may be secured in an open position that best fits a patient's tooth size, it will be appreciated that the dentist can easily place the dental dam around the desired tooth.

In other words, as the handles 110A, 110B approach each other, the pivoting bars 120A, 120B pivot on pivot pin 124 thereby reducing the distance between the pivoting bars 120A, 120B. As the pivoting bars 120A, 120B approach each other, the pivot pin 124 moves linearly toward the handles 110A, 110B. This causes lower arm manipulation bars 122A, 122B to likewise slide in the channels 132A, 132B linearly toward the handles 110A, 110B as well. Additionally, the distal end pivots at shaft member pin 118, causing the arms 140A, 140B and 141A, 141B (FIG. 5) to separate. The lower arm manipulation bars 122A, 122B are coupled to lower arms 140A, 140B. As a result, the lower arms 140A, 140B likewise move linearly toward the handles 110A, 110B while simultaneously separating from one another. The upper arms 141A, 141B are coupled to shafts 114, 116 at their distal ends 115A, 115B. As a result, as the arms 140A, 140B and 141A, 141B separate from one another, a quadrant is formed, as shown in FIGS. 7-10. The band 134 allows the dentist to secure the handles 110A, 110B, and therefore arms 140A, 140B and 141A, 141B, in a fixed position by using slots 136. However, while band 134 and slots 136 are described, other fixed-positioning methods may be used, such as overlapping teeth on protrusions from each shaft member 114, 116 (e.g., locking mechanism of hemostats) or other methods known in the art.

Figure 7:
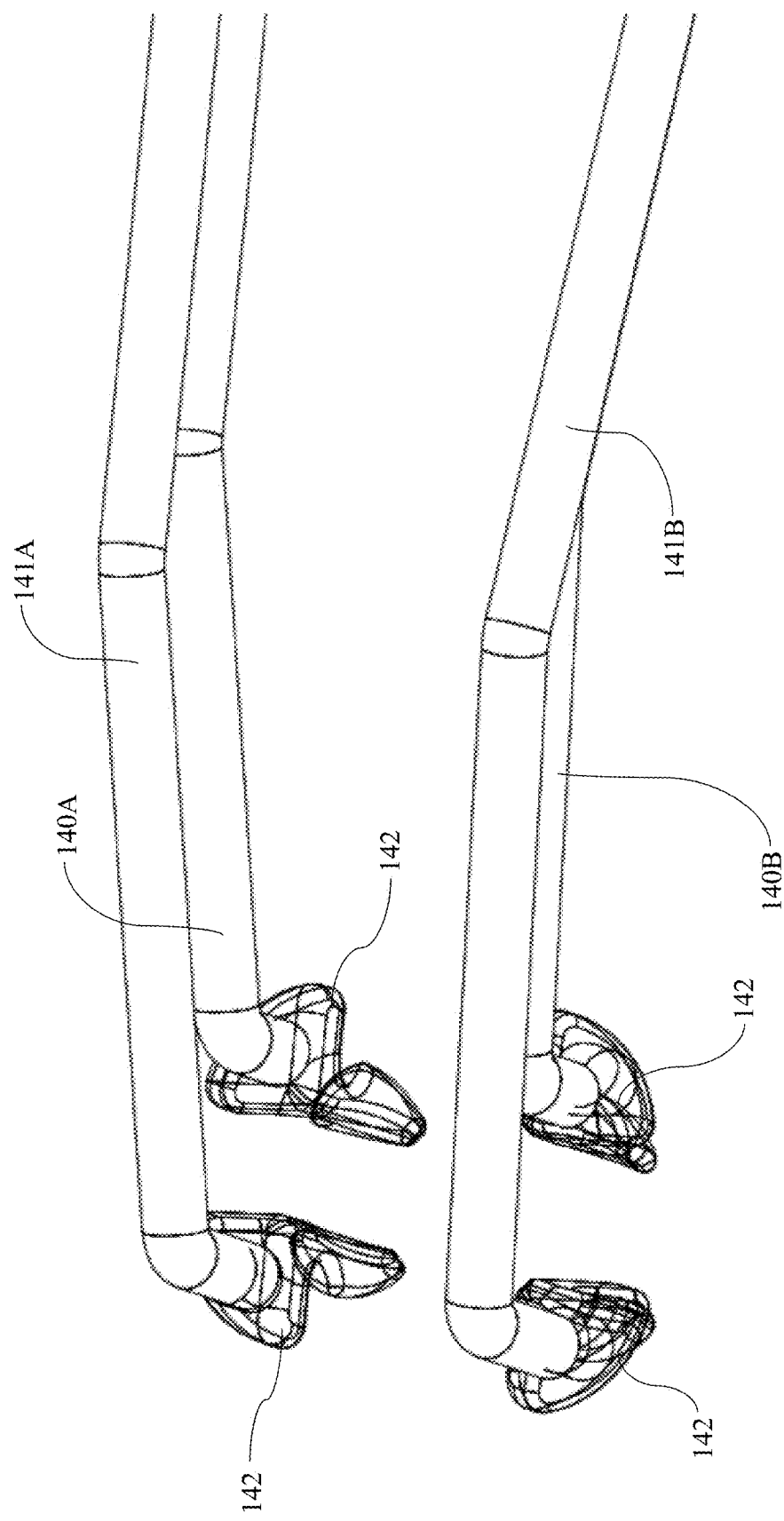
FIG. 7 is a top perspective view of a tip of a dental tool comprising a plurality arms and prongs, of a dental isolation system.
Figure 8:
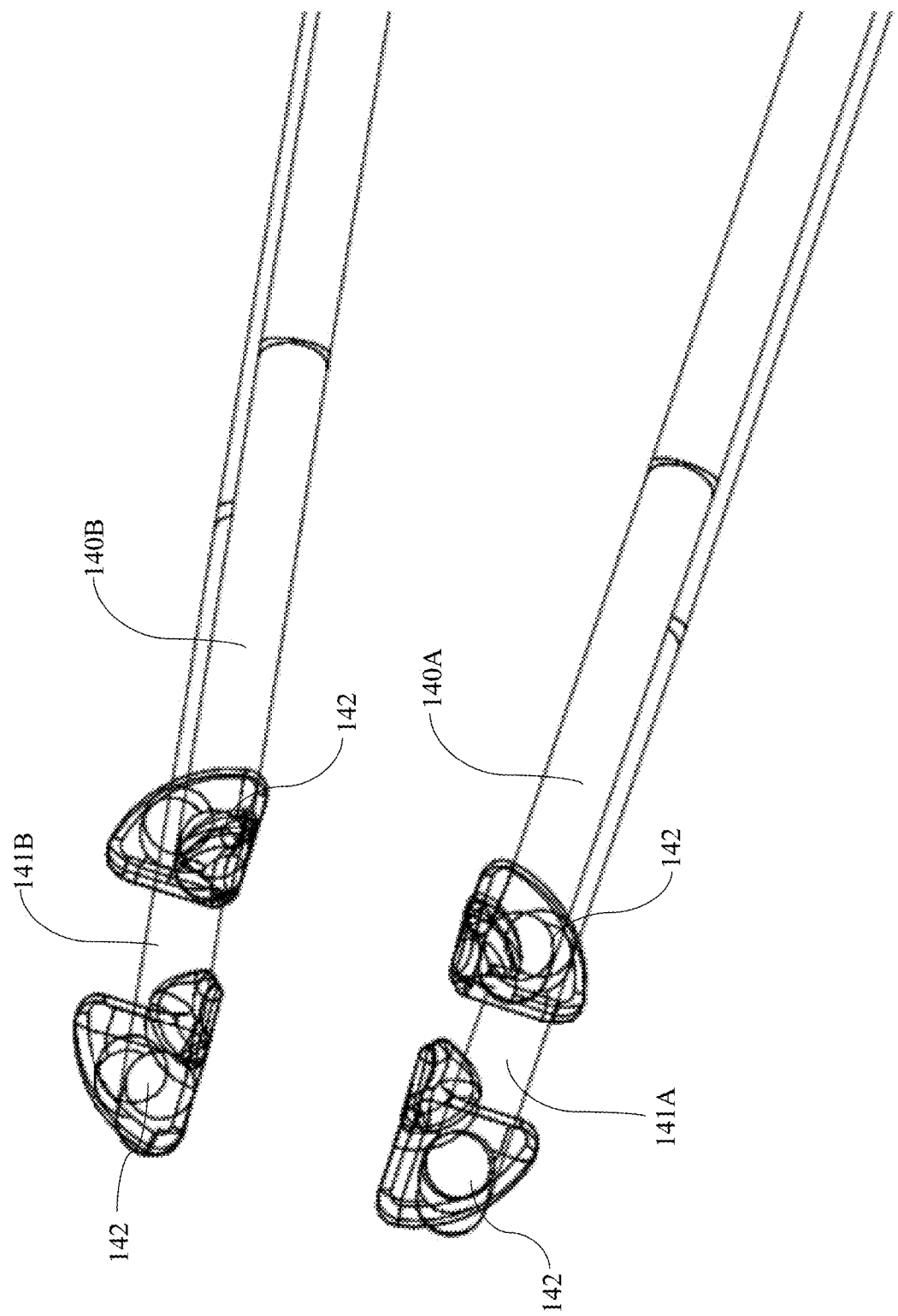
FIG. 8 is a bottom plan view of a tip of a dental tool comprising a plurality arms and prongs, of a dental isolation system.
Figure 9:
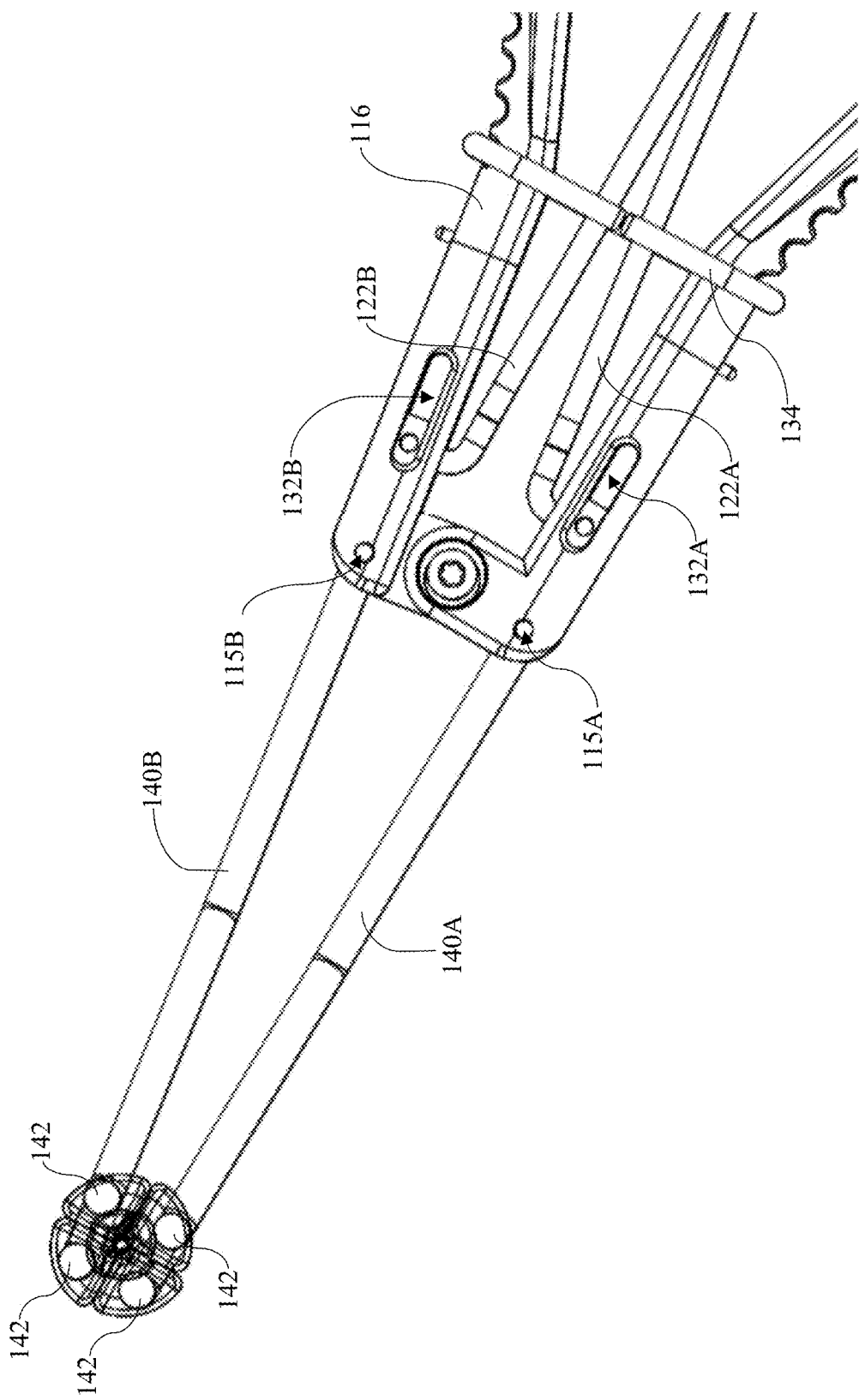
FIG. 9 is a bottom plan view of a tip and body of a dental tool of a dental isolation system.
Figure 10:
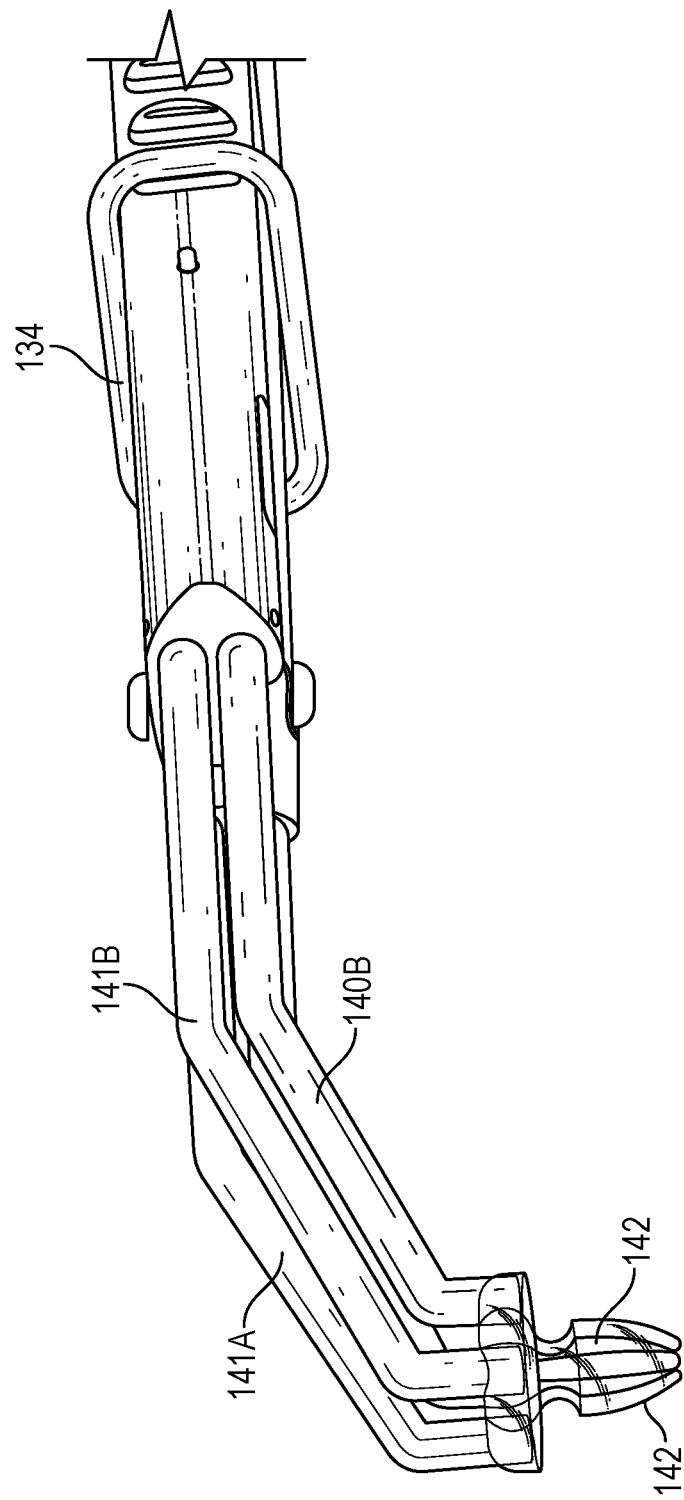
FIG. 10 is a side perspective view of a tip and body of a dental tool of a dental isolation system.
Figure 11:
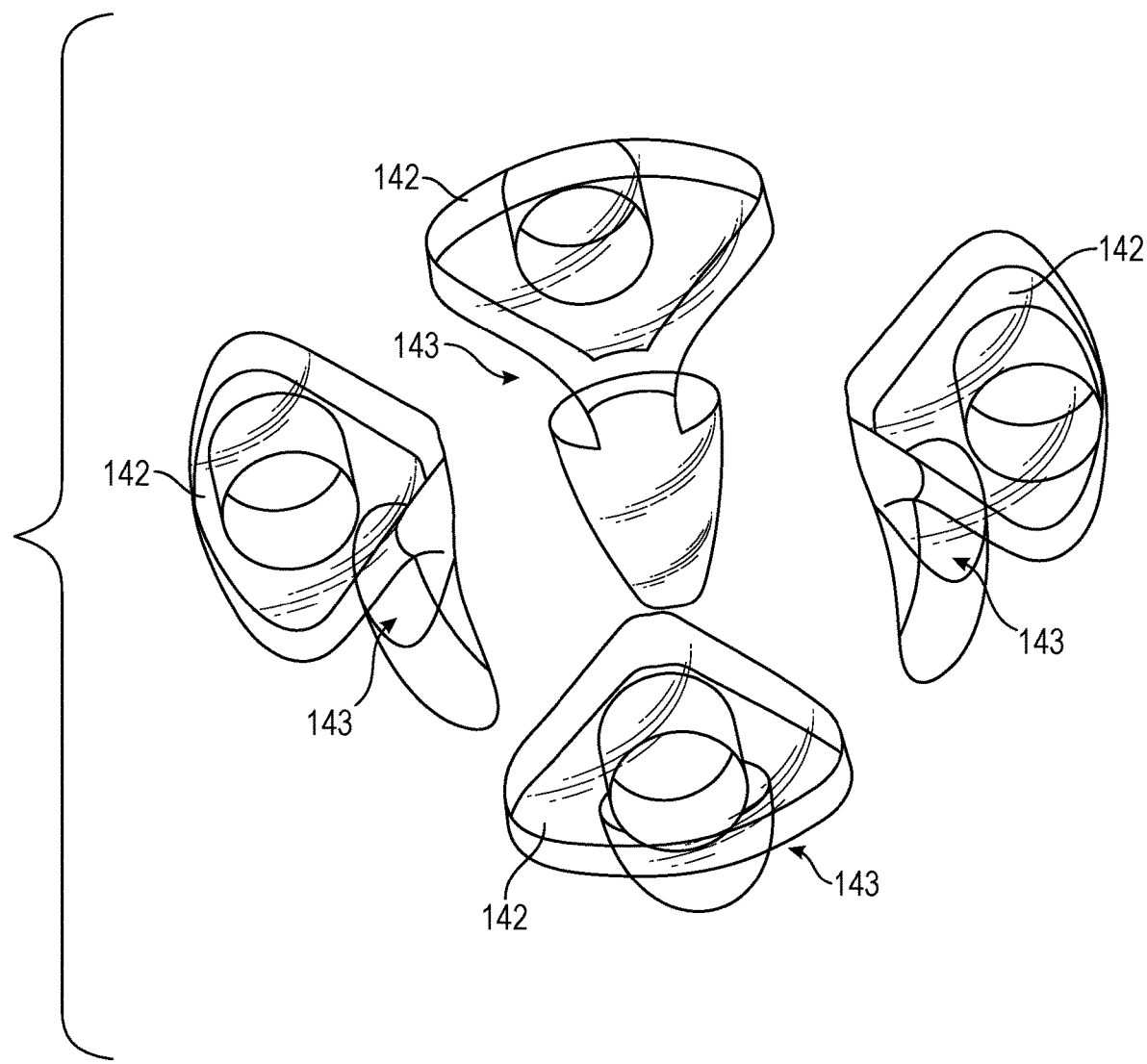
FIG. 11 is a top perspective view of the prongs of a dental tool of a dental isolation system.
Figure 12:
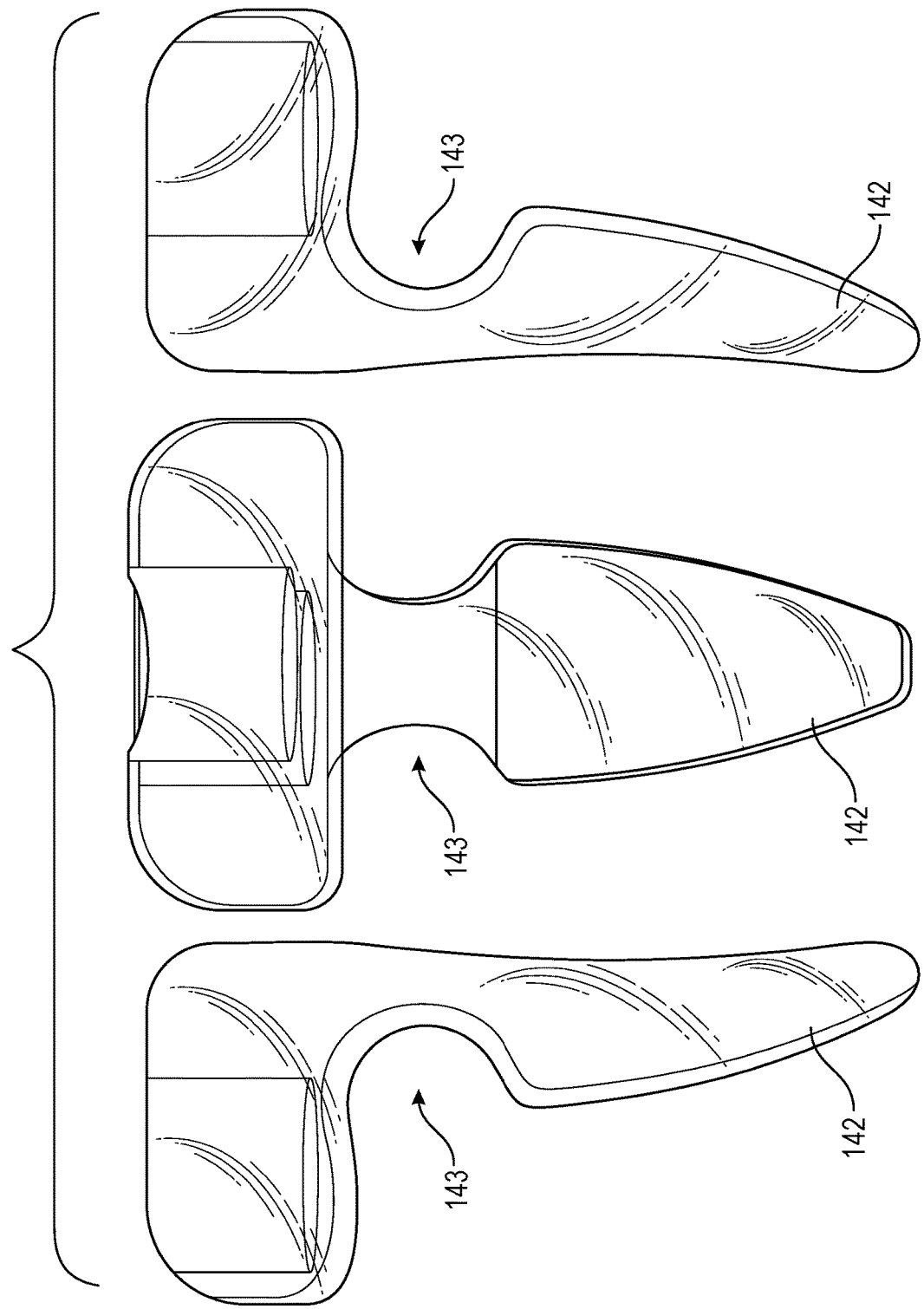
FIG. 12 is a side elevation view of the prongs of a dental tool of a dental isolation system.
Figure 13:
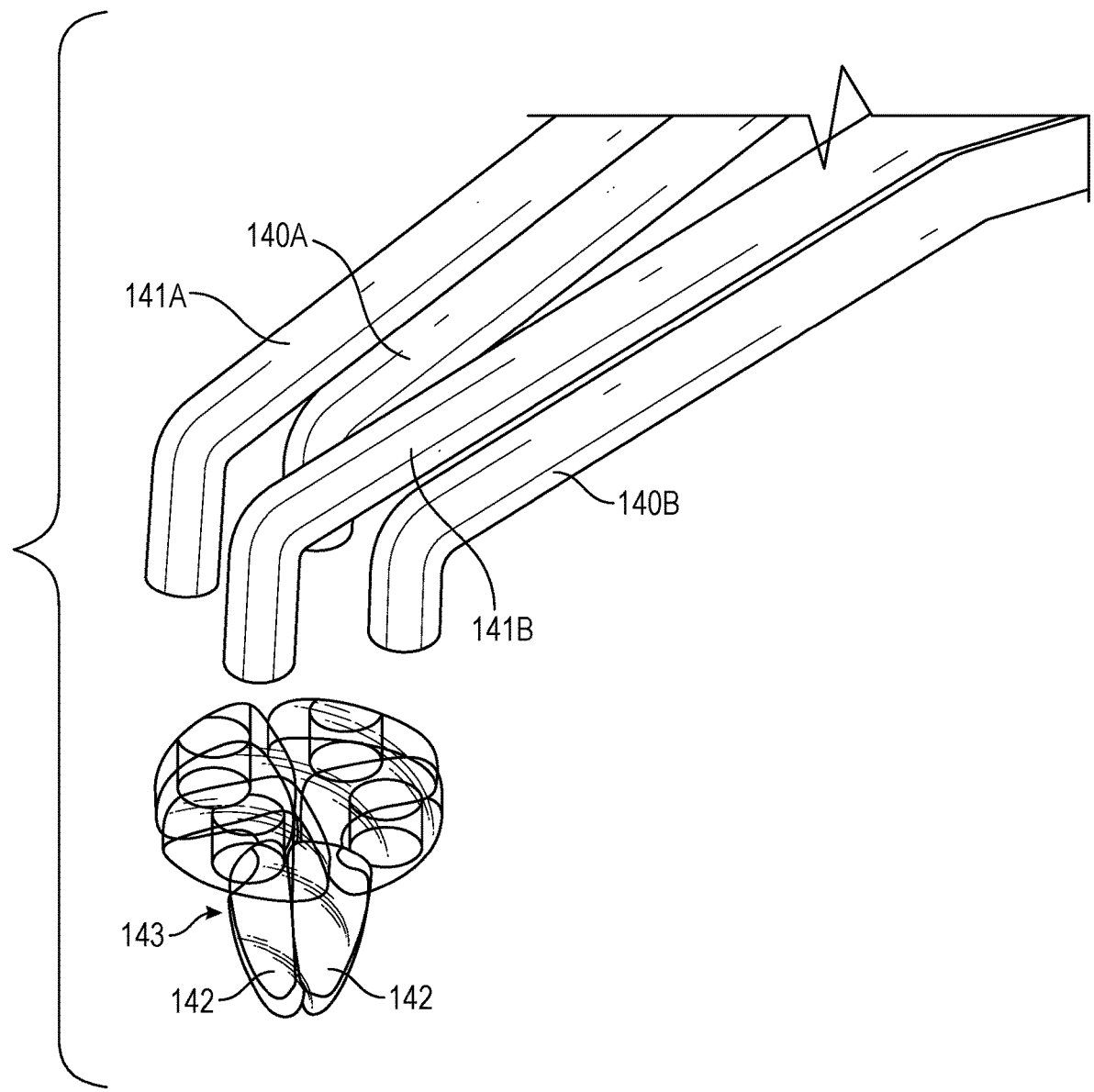
FIG. 13 is a disassembled top, perspective view of the prongs and arms of a dental tool of a dental isolation system.
Figure 14:
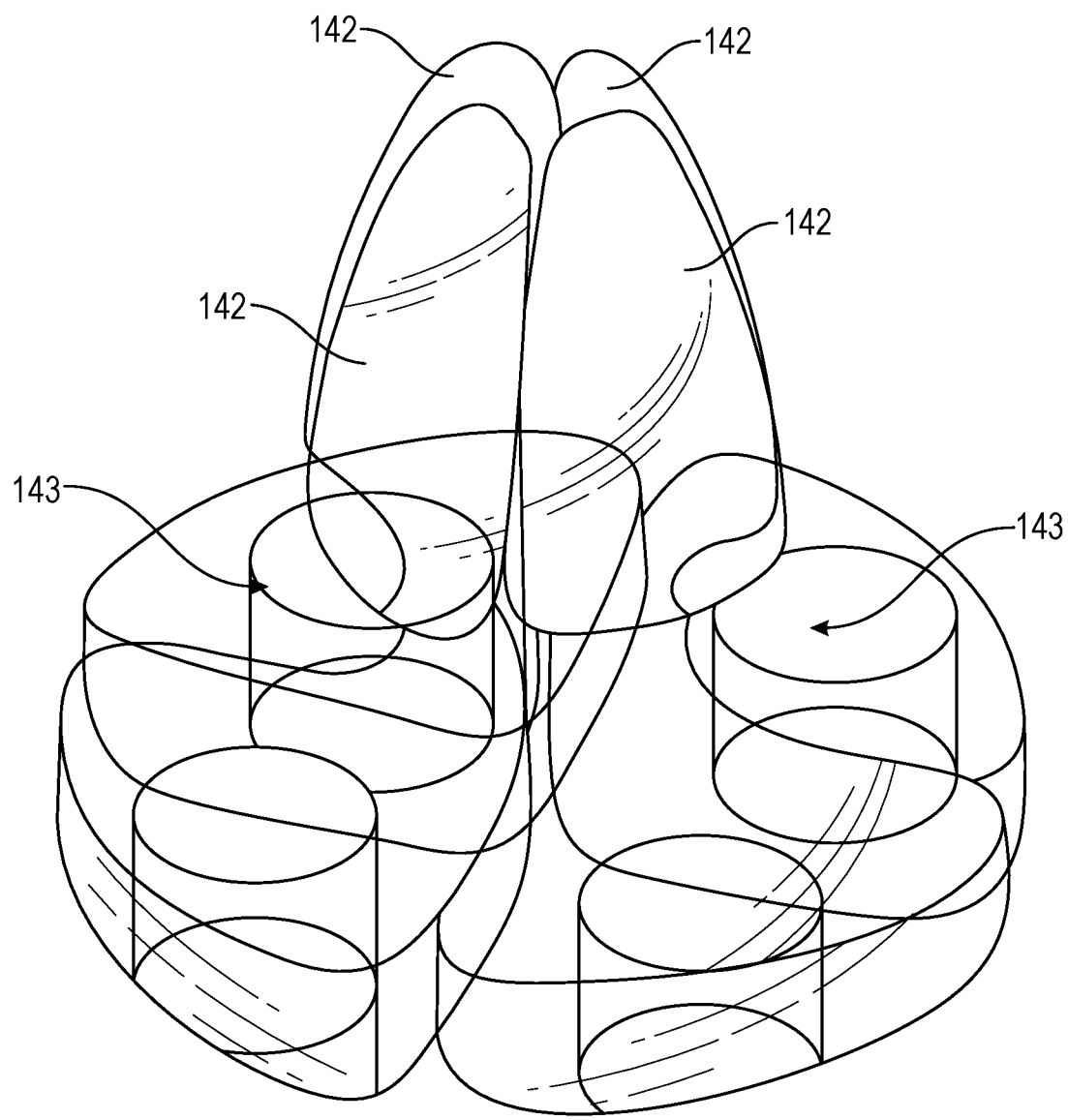
FIG. 14 is a bottom perspective view of the prongs in a closed configuration of a dental tool of a dental isolation system.

As shown in FIGS. 6-10, the tip portion 106 comprises lower arms 140A, 140B and upper arms 141A, 141B. As discussed above, the lower arms 140A, 140B are coupled to the lower arm manipulation bars 122A, 122B, respectively, and the upper arms 141A, 141B are coupled to distal ends 115A, 115B, respectively, of shafts 114, 116. Four arms 140A-B, 141A-B are used so as to form a quadrant (e.g., FIGS. 7-8) for fitting around a patient's tooth. However, it will be appreciated that more or fewer arms may be implemented so long as the dentist is able to easily stretch and fit the O-ring around the desired tooth. When in a closed or open position, the upper arms 141A-B are positioned substantially above lower arms 140A, 140B (FIGS. 8-9).

Referring to FIGS. 6-10, the tip portion 106 further comprises a plurality of prongs 142 that, when closed, are proximal to (abutting, ideally) one another (FIGS. 9-10) and when separated, form a quadrant with each of the prongs physically separated from on another (FIGS. 7-8). Each of the prongs 142 are coupled to a respective arm 140A-B, 141A-B. Further, referring to FIGS. 11-14, each of the prongs 142 comprises a recessed portion 143 for maintaining the dental dam in position during placement. The prongs 142 are also shaped so as to easily penetrate the O-ring 146 (FIG. 15).

Figure 15:
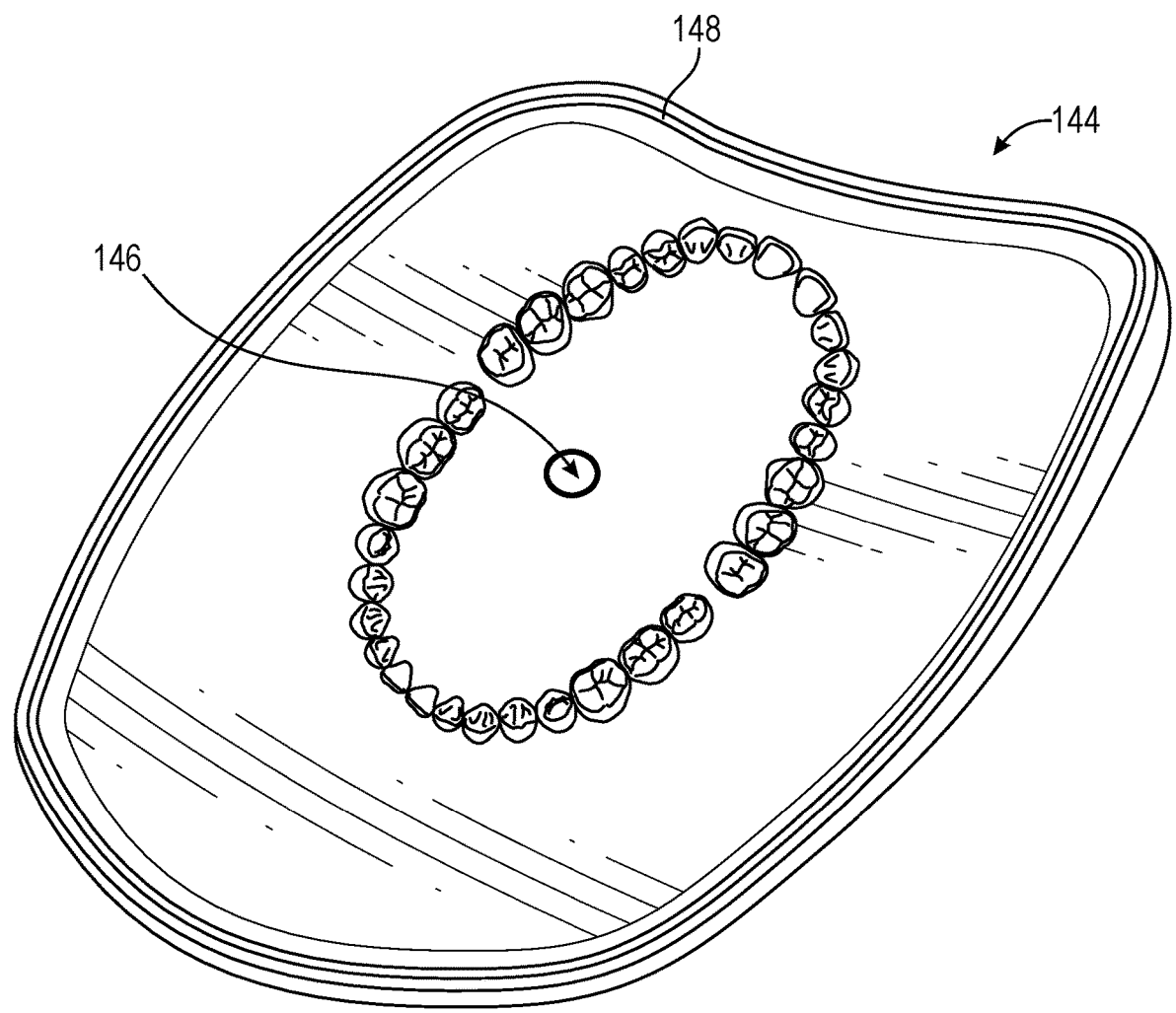
FIG. 15 is a front perspective view of a dental dam of a dental isolation system.

As shown in FIG. 15, the dental isolation system 100 further comprises a dental dam 144 with an O-ring 146 integrated therein. The dental dam 144 may be latex, nitrile, or any other suitable material for use during oral procedures. Further, the dental dam has a rigid or semi-rigid frame 148 around its perimeter to ensure that it remains stretched over the entire oral cavity and rests comfortably on a patient's face. The dental dam 144 is used to isolate a tooth and protect a patient. As shown, the dental dam 144 may have an oval-like formfactor. However, it will be understood that the dental dam 144 is not limited to a specific formfactor and may be a circle, square, rectangle, etc. The size of the dental dam 144 may also vary depending on the size of the patient. As an example, the dental dam 144 may be small in size to accommodate the smaller teeth and mouth of a child. In similar manner, there may be medium sizes for youth and large for adults. Further, the placement of the O-ring 146 in the dam 144 may vary to facilitate easier placement for different teeth.

To use the dental isolation system 100, with the handles 110A, 110B in a first position, the dentist would insert the plurality of prongs 142, which are abutting one another, into the O-ring 146 on the dental dam 144. The O-ring 146 is received by the recessed portion 143 located on the plurality of prongs 142. As the dentist applies pressure to the handles 110A, 110B, the distance between the handles 110A, 110B decreases. When the distance between the handles 110A, 110B decreases (a second position), the distance between the plurality of prongs 142 increases, thereby expanding the O-ring 146. The more the O-ring 146 expands, the thinner it becomes so that it can fit between two teeth. The dentist will then position the O-ring 146 around a tooth to isolate it. Once the O-ring 146 is positioned around the desired tooth, the dentist will release the O-ring 146 and remove the dental tool 102. It will be appreciated that the dental isolation system 100 allows a dentist to quickly and easily protect a patient due to the ease of the system and lack of using metal clamps. As discussed earlier, when metal clamps are used, a patient may be injured, such as by the metal clamps causing damage to the soft tissue surrounding the gums. Further, the metal clamp may fall into and obstruct a patient's airway. Accordingly, the dental isolation system described herein is a significant improvement over the prior art.

Figure 16:
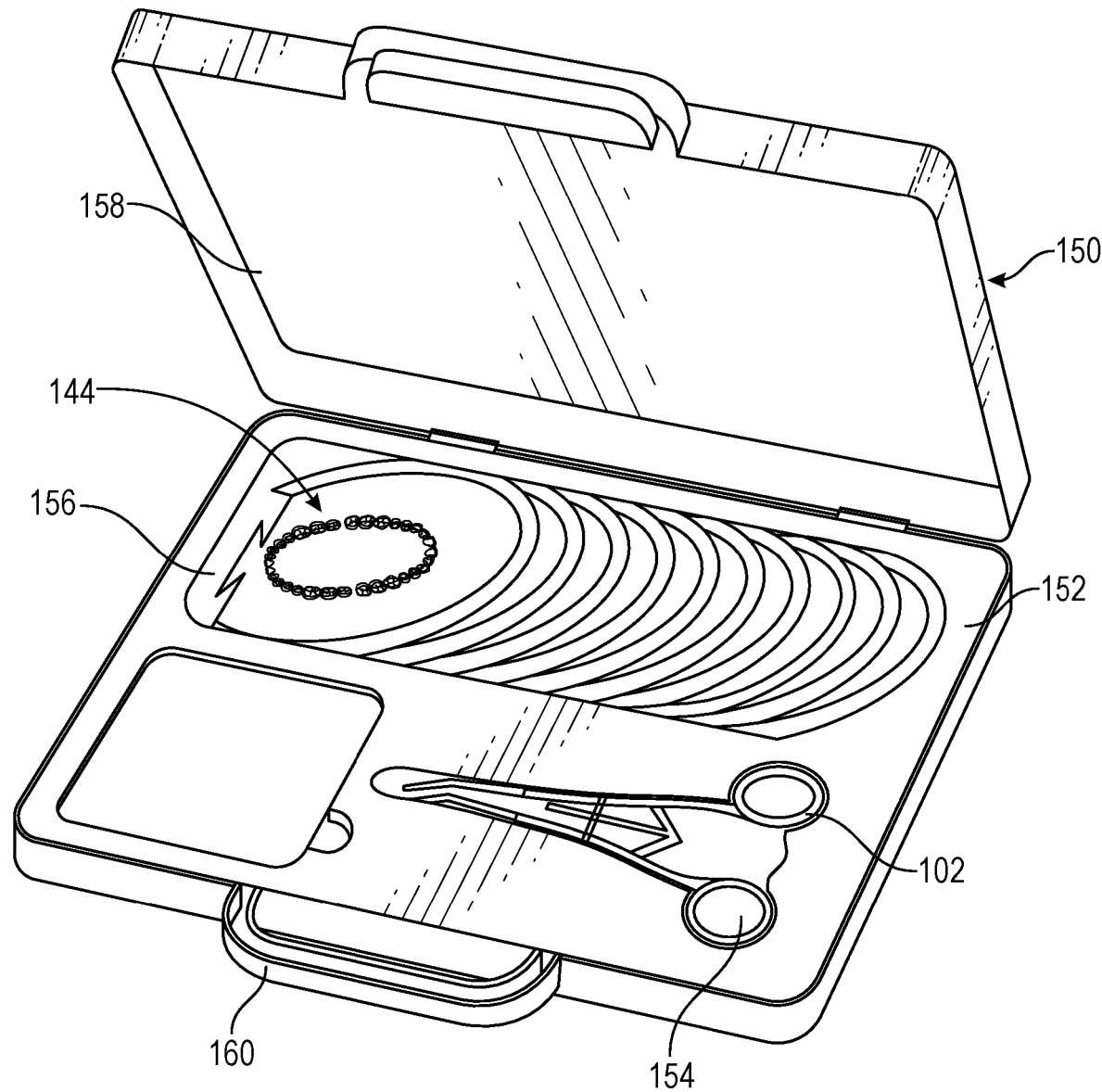
FIG. 16 is a top perspective view of a dental isolation system in a carrying case.

In one embodiment, as shown in FIG. 16, a dental isolation system 100 comprises a carrying case 150 that includes a housing 152, a recessed dental tool portion 154, and a recessed dental dam portion 156. The carrying case 150 also comprises a lid 158 that is hingedly attached thereto and a handle 160 so as to carry the case 150. The dental tool 102 may be placed into the recessed dental tool portion 154 and numerous dental dams 144 may be placed in the recessed dental dam portion 156.

By avoiding the use of a metal clamp, many of the drawbacks connected with the use of dental dams are alleviated. For example, no safety line (dental floss) is required, nor are clamps or brackets required. The dental isolation system disclosed herein is more comfortable to the patient, easier to use, does not obstruct access to the clamped tooth, and stable placement is assured. Accordingly, the dental isolation system is a significant improvement over the prior art.

Exemplary embodiments are described above. No element, act, or instruction used in this description should be construed as important, necessary, critical, or essential unless explicitly described as such. Although only a few of the exemplary embodiments have been described in detail herein, those skilled in the art will readily appreciate that many modifications are possible in these exemplary embodiments without materially departing from the novel teachings and advantages herein. Accordingly, all such modifications are intended to be included within the scope of this invention.

What is claimed is:
1. A dental isolation system, comprising:
a dental tool for placing a dental dam in a patient's mouth, the dental tool comprising:
a first handle comprising a finger aperture, a shaft member, and a tip portion comprising an upper arm and a lower arm;

a second handle comprising a finger aperture, a shaft member, and a tip portion comprising an upper arm and a lower arm;

the shaft member of the first handle and the shaft member of the second handle pivotally coupled together via:
  a) a shaft member pin coupling a distal end of the shaft member of the first handle to a distal end of the shaft member of the second handle, and
  b) a first pivoting bar pivotally coupled to a second pivoting bar via a pivot pin;

a first lower arm manipulation bar coupling the pivot pin to the lower arm of the tip portion of the first handle;

a second lower arm manipulation bar coupling the pivot pin to the lower arm of the tip portion of the second handle;

four prongs, each prong coupled to an end of the upper arms and lower arms, respectively;

wherein when the first handle and second handle are in a first position, the prongs are abutting one another; and wherein when the first handle and the second handle are in a second position, the prongs form a quadrant.

2. The dental isolation system of claim 1, further comprising a dental dam having an O-ring.

3. The dental isolation system of claim 2, wherein the dental dam comprises a frame.

4. The dental isolation system of claim 1, further comprising a loop moveable on the first and second shaft members and configured to engage a plurality of slots on the first and second shaft members to fix the position of the first handle and second handle in relation to one another.

* * * * *